Feb. 17, 1942.     T. A. BOWERS     2,273,691
OFFSET PISTON RING CONSTRUCTION
Filed Nov. 7, 1940

Inventor:
Thomas A. Bowers
by Munro H. Hamilton
Attorney

Patented Feb. 17, 1942

2,273,691

UNITED STATES PATENT OFFICE 2,273,691

OFFSET PISTON RING CONSTRUCTION

Thomas A. Bowers, Mattapoisett, Mass., assignor to Power Research Corporation, Boston, Mass., a corporation of Massachusetts Application November 7, 1940, Serial No. 364,674

6 Claims. (Cl. 309—45)

This invention relates to oil control piston rings and more especially to piston rings formed from sheet materials.

A principal object of the invention is to improve piston rings and to devise cheap, efficient, flexible, sheet metal ring structures having incorporated therein circumferential edges which are spaced apart to collect oil and to take the place of separate C-type rings and other types of oil metering rings. The invention also aims to provide in rings of the character noted, improved oil passages. A still further object is to indicate means for reducing formation of carbon, and to impart novel strengthening features in flexible piston rings fabricated from sheet metal.

The nature of the invention, and its objects, will be more fully understood from the following description of the drawings and discussion relating thereto.

In the accompanying drawing:

Fig. 4 is a fragmentary perspective view illustrating still another step in the method referred to.

Figure 3:
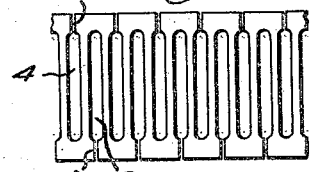
Fig. 3 is a fragmentary plan view illustrating a further step in the formation of a piston ring from sheet material.

In an earlier Patent No. 2,224,338, issued December 10, 1940, I have disclosed a method of making piston rings from resilient sheet materials such as spring steel, alloy, or other metal or suitable substances. Briefly, the method consists in forming a strip 1 with openings 2 and 3 which alternately extend from opposite edges of the strip in overlapping relation with respect to one another. A somewhat similar result may be obtained by forming relatively large openings as 4, and relatively small openings as 5 connecting with the openings 4, at one side of the strip, and relatively large and small openings 6 and 7 at the other side of the strip, as shown in Fig. 3. The strip is folded longitudinally of itself to provide a member of substantially U-shaped formation having spaced apart radially extending sides 8 and 9, connected by web portions 10 and 11. The web portions are in turn spaced apart to form oil passages 12. A suitable length of the U-shaped material may be formed into a piston ring having spaced-apart oil scraping edges, highly efficient in metering oil on the wall of a cylinder.

The ring structure thus formed is characterized by novel flexibility both circumferentially and radially, and the separated segments making up the sides are movable with respect to one another. This is effected by the cuts or openings occurring in overlapping relation. These openings or cuts allow the intervening sections or portions of the strip 1 to be bent or flexed toward one another in the plane of the strip. The resiliency of the metal of which the strip is composed causes these portions thereafter to spring back to their normal position. In the ring, this provides circumferential and radial extensibility and contractility.

Figure 1:
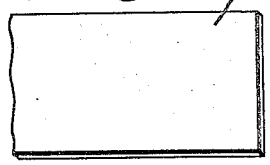
Fig. 1 is a fragmentary perspective view of a sheet material employed in making piston rings in accordance with the invention.
Figure 2:
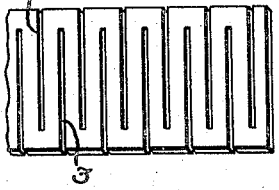
Fig. 2 is a plan view illustrating a step in the manufacture of a ring of the invention.
Figure 4:
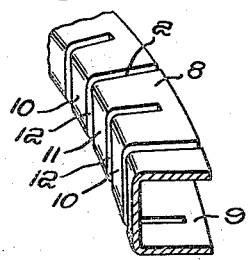
Figure 5:
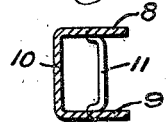
Fig. 5 is a view in cross section illustrating still another step.
Figure 6:
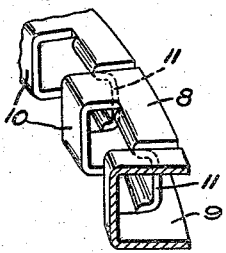
Fig. 6 is a fragmentary perspective view of the finished ring of the invention.

In accordance with the present invention, a ring is constructed in the same general manner described above, in which the strip 1 is formed by some suitable means with the overlapping cuts 2 and 3, and the strip is then folded longitudinally of itself, as illustrated in Figs. 1, 2 and 4. At this point, however, the ring is subjected to a further step by which connecting portions 11 of the strip, included between the overlapping openings, are arranged in offset or staggered relation with respect to other such portions 10, to effect various novel and desirable results. In a preferred embodiment of the ring of the invention, alternate connecting portions 11 are bent in a direction radially outward of the ring as illustrated in Fig. 5. The extent of the bending may vary, and preferably will be carried out to a point where the sheet material is partially doubled over upon itself at opposite sides of the ring, as has been more clearly shown in Fig. 6.

Figure 10:
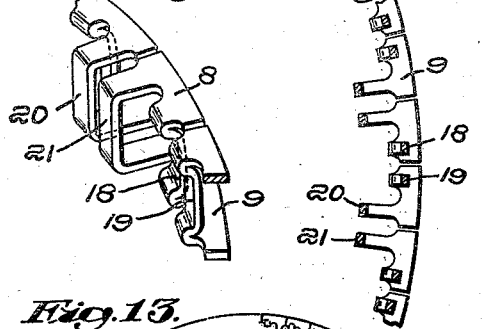
Fig. 10 is a fragmentary cross sectional view illustrating die members employed in forming the ring described in Figs. 1-6 inclusive.
Figure 11:
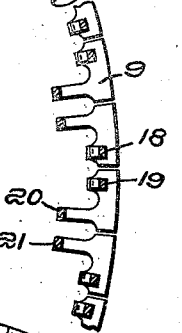
Fig. 11 is another fragmentary cross sectional view illustrating the die members indicated in Fig. 10 in a closed position.
Figure 13:
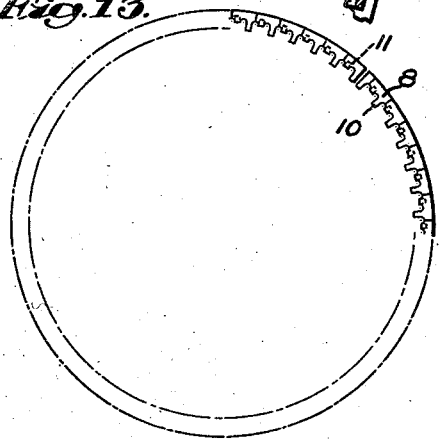
Fig. 13 is a plan view of a finished ring.
Figure 12:
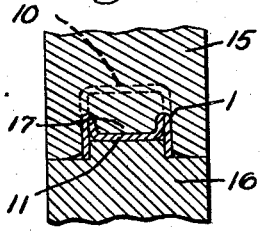
Fig. 12 illustrates still another fragmentary cross sectional view of die members employed in making the ring of the invention.

The formation of a ring of the character noted from sheet material may be readily effected by tool machinery such as dies, punches, rolls and the like. The offset or staggered disposition of the connecting portions with respect to one another may be effected in any suitable manner as by the use of die members 13 and 14, illustrated in Fig. 10, which may be employed to bend a straight length of sheared or punched material, as illustrated in Fig. 2, into a U-shaped body, as shown in Fig. 11. Thereafter, another somewhat similar set of dies, as 15 and 16, may be employed to effect the offset arrangement of the connecting portions 11. The die 15 in this arrangement is provided with spaced-apart ribs 17, which are adapted to bend the connecting portions 11 away from the connecting portions 10 into corresponding depressions in the die 16. It will be seen that the use of tool machinery greatly facilitates the manufacture of piston rings.

An important feature of the ring of the invention consists in the novel oil passage construction obtained by offsetting connecting portions 11 with respect to other such connecting portions as 10. It is desirable to provide, in an oil ring, as large an oil passage as possible in order to facilitate recirculation of oil, collected by the ring, down through the piston and back into the crankcase. This must be effected without materially weakening the body of the ring itself. In the patent referred to, relatively large oil passages were provided, in some instances, by forming a ring, such as that shown in Fig. 3 of the drawings, in which openings 4 and 6 are wider than the openings 5 and 7. However, in a ring such as that shown in Fig. 2, the cuts 2 and 3 may be efficiently and quickly formed by shearing dies with no metal being stamped out at all. In this case, there is some decrease in the total available oil passageways in the ring. It will be observed that by the offset or staggered arrangement of the connecting portions 10 and 11, these members become spaced apart from one another in a direction radially of the ring to form very satisfactory oil passages. The offset arrangement of the connecting portions is therefore effective in insuring the practicality of forming overlapping openings by means of slits or cuts instead of punching out portions of sheet material.

Another important advantage is also obtained by the offset arrangement of the connecting portions of the ring. This relates to reduction in the formation of carbon around the connecting portions. It will be seen that on connecting portions which are allowed to remain adjacent one another along the inner periphery of a ring, there may occur deposits of carbon which tend to decrease the size of the openings between the connecting portions and to slow passage of oil through the ring. By the offset arrangement of the connecting portions in the ring of the invention, the possibility of carbon formation bridging across the openings is greatly reduced, and the amounts of carbon which do form fail to materially affect the size of the openings. This insures long operating life of the ring without change in its ability to circulate oil.

Still another advantage is derived from the offset arrangement of the web portions consisting in the development of substantially increased strength in the body portion of the ring. The offset connecting portions 11 are bent forwardly and this tends to stiffen the ring as a whole and in particular to reduce its yieldability in a direction axially thereof. The stiffening characteristic is useful in seating the ring and in other ways.

Figure 7:
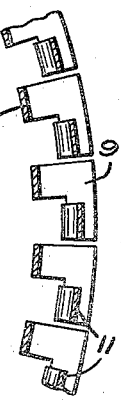
Fig. 7 is a plan cross section of a ring similar to that shown in Fig. 6.
Figure 8:
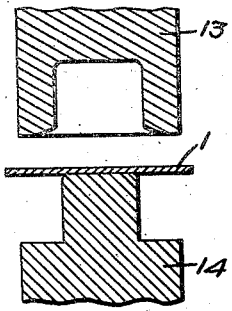
Fig. 8 is a fragmentary perspective view illustrating a modification of the ring of the invention.
Figure 9:
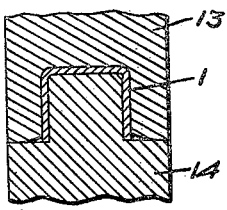
Fig. 9 is a fragmentary plan view of a ring similar to that illustrated in Fig. 8.

I may desire to construct piston rings with modifications of the offset arrangement of the connecting portions described. For example, in Figs. 8 and 9, I have illustrated a ring of the same general character as that shown in Figs. 6 and 7, in which adjacent connecting portions 18 and 19 are bent in a direction radially outward of the ring, while the next adjacent pair of connecting portions 20 and 21 are left unchanged. This general arrangement is continued throughout the ring and is intended to be further illustrative of various other arrangements in which groups of connecting portions may be offset with respect to other connecting portions. It is pointed out that this arrangement tends to increase the size of the oil passages, may also reduce formation of carbon and effect additional strengthening results.

Figure 14:
Fig. 14 is a cross sectional view of a modified type of piston ring material.

Various other changes and modifications may be resorted to, both in the form of the ring and its method of construction, such as are set forth in the patent referred to. I may desire to utilize a strip of material 22 having a relatively thickened mid-portion, as illustrated in Fig. 14 for the purpose of providing a ring whose connecting portions will be thicker than the portions of the strip making up the extending sides of the ring. The method of making the ring may be modified in various other ways in addition to the modifications generally indicated in Figs. 2, 3, 10 and 11. I may desire to carry out the offset disposition of the connecting portions of the ring simultaneously with the forming of the strip into a U shape. Various other types of forming tools may be employed, as for example cutting and forming members adapted to produce a number of strips from a relatively large sheet.

It will be seen that the improved ring construction embodies a cheap, efficient and durable means of metering oil, ample provision for oil passageways is provided irrespective of the method of forming overlapping openings in a strip of sheet metal, means for reducing the formation of carbon are indicated, and strengthening features are furnished. Other advantages noted in greater detail in the above noted patent may also be derived from the ring of the present invention.

Having described my invention, I claim:

1. A flexible piston ring comprising a strip of piston ring material folded longitudinally of itself, said strip having openings extending transveresly inward from each of its edges in overlapping relation, said openings defining crowns and connecting web portions and said web portions being arranged in staggered relation in a direction radially of the ring.

2. A piston ring comprising spaced-apart layers of sheet metal, said layers including circumferentially spaced-apart segments, connecting portions for said layers, said ring having a part of the said connecting portions constituting the inner periphery thereof, the remaining connecting portions being bent away from the said first connecting portions in a direction radially of the ring.

3. A circumferentially and radially flexible piston ring comprising spaced-apart layers of sheet metal, said layers including a plurality of circumferentially spaced-apart segments, connecting portions for the said layers, a part of said connecting portions extending radially inward of the ring beyond the said layers to form the inner periphery of the ring, the remaining connecting portions bent away from the inner periphery of the ring to form relatively large oil passages between the connecting portions.

4. A flexible piston ring comprising a strip of sheet metal, said strip having openings extending transversely inward from each of its edges in overlapping relation with respect to one another, said strip being bent transversely with respect to the said openings and having both of its edges occurring in spaced-apart relation at the outer periphery of the ring, and alternate connecting portions only of the strip included between the overlapping openings being bowed in a direction radially outward of the ring.

5. A flexible piston ring comprising a strip of sheet metal folded longitudinally of itself, said strip having openings extending transversely inward from each of its edges in overlapping relation with respect to one another, portions of the said strip included between the overlapping openings being spaced apart in a direction radially of the ring.

6. A flexible piston ring comprising a strip of resilient sheet metal, said strip having openings extending transversely inward from each of its edges in overlapping relation with respect to one another, said strip being bent transversely with respect to the said openings to provide spaced-apart upper and lower sides of the ring, connecting portions for the sides occurring at the inner periphery of the ring, other connecting portions bent over into contact with the sides and extending axially therebetween for the purpose of maintaining the sides in substantially fixed position with respect to one another in a direction axially of the ring.

THOMAS A. BOWERS.